United States Patent Office 2,838,478
Patented June 10, 1958

2,838,478

HYDROXYLATED LIQUID DIENE COPOLYMERS AND ESTERS THEREOF

John C. Hillyer and Lee O. Edmonds, Bartlesville, Okla., assignors to Phillips Petroleum Company, a corporation of Delaware No Drawing. Application October 25, 1954
Serial No. 464,628

8 Claims. (Cl. 260—85.1)

This invention relates to hydroxypolydienes and esters thereof. In one embodiment, a liquid polymeric material prepared by the polymerization of conjugated dienes, either alone or in admixture with each other and/or with other compounds copolymerizable therewith, is hydroxylated by reaction with hydrogen peroxide, or a compound capable of yielding hydrogen peroxide, in the presence of formic acid or the lower alkyl esters thereof for a time and at a temperature sufficient to produce a new and useful product. In another embodiment, a liquid polymer or copolymer is hydroxylated by reaction with hydrogen peroxide in the presence of formic acid as a catalyst for a time and at a temperature sufficient to produce a hydroxylated polymeric material which ranges from a glassy solid to a viscous liquid. In one specific embodiment, a liquid polymeric material is hydroxylated by reaction with aqueous hydrogen peroxide in the presence of formic acid as catalyst for a time and at a temperature sufficient to produce a hydroxylated polymeric material which is a viscous liquid, and the hydroxylated polymeric material is further reacted with a monobasic organic acid to produce new and useful esters of hydroxylated polymeric material. In another specific embodiment, the hydroxylated polymeric material is partially hydrogenated and then esterified with a monobasic organic acid. In still another specific embodiment the hydroxylated polymeric material is further reacted with a phosphorus-containing esterifying agent to produce new and useful phosphorus-containing esters of hydroxylated polymeric material. In yet another specific embodiment, the hydroxylated polymeric material is partially hydrogenated and then esterified with a phosphorus-containing esterifying agent.

This application is a continuation-in-part of our copending application Serial No. 204,062, filed January 2, 1951, now U. S. Patent No. 2,692,892.

The products of our invention, i. e., hydroxylated polymers and copolymers and esters thereof, have been found to be particularly useful as plasticizers and tackifiers for natural and synthetic rubber. The products of our invention are also useful, per se, as coating materials for metals. Other uses for the products of our invention are as adhesives and additives for drying oils.

The following are objects of the invention.

It is an object of the present invention to provide new and useful hydroxylation products of liquid polymers and copolymers.

Another object of the invention is to provide a novel process for the hydroxylation of polymers and copolymers.

Another object of the invention is to provide new products which are useful as plasticizers and tackifiers for natural and synthetic rubber.

Another object of the invention is to provide a process for the production of esters of hydroxylated polymers and copolymers.

Another object of the invention is to provide a process for the production of esters of partially hydrogenated hydroxylated polymers and copolymers.

Another object of the invention is to provide a process for the production of phosphorus-containing esters of hydroxylated polymers and copolymers.

Another object of the invention is to provide a mixed phosphorus-containing ester of hydroxylated polymers and copolymers.

Another object of the invention is to provide esters of hydroxylated polymers and copolymers which are useful as plasticizers and tackifiers for natural and synthetic rubber.

Another object of the invention is to provide esters of partially hydrogenated hydroxylated polymers and copolymers.

Other and further objects of the invention will become apparent to those skilled in the art upon reading the accompanying disclosure.

In the practice of one embodiment of our invention, a liquid polymeric starting material is hydroxylated by reacting same with hydrogen peroxide or a compound capable of yielding hydrogen peroxide, with or without a solvent, in the presence of a catalyst, for example, formic acid or the lower alkyl esters thereof, for a time and at a temperature sufficient to yield a hydroxylated polymeric material ranging in appearance from a glassy solid to a viscous liquid.

The liquid polymeric starting material of our invention includes polymers prepared by the polymerization of conjugated dienes containing from 5 to 8 carbon atoms, such as isoprene (2-methyl-1,3-butadiene), piperylene (1,3-pentadiene), 2,3-dimethyl-1,3-butadiene, 1,3-hexadiene, 2,4-hexadiene, 2,4-heptadiene, 2,4-dimethyl-1,3-hexadiene and copolymers prepared by the polymerization of conjugated dienes containing from 4 to 8 carbon atoms such as 1,3-butadiene and the aforementioned monomers, either in admixture with each other and/or with lesser amounts of one or more other compounds containing an active $CH_2=C<$ group which are copolymerizable therewith, such as styrene, acrylonitrile, methacrylonitrile, methyl acrylate, methyl methacrylate, vinyl acetate, vinyl chloride, 2-methyl-5-vinylpyridine, 2-vinylpyridine, 4-vinylpyridine, etc. In one specific embodiment of our invention, the liquid polymeric starting material is selected from the group consisting of a polymer of isoprene, a copolymer of butadiene and styrene, and a copolymer of butadiene and isoprene. The liquid polymeric starting material is characterized by its low molecular weight, less than 5000 and preferably less than 2000, and by having a viscosity in the range of 100 to 6000, and preferably in the range of 400 to 1400 Saybolt Furol seconds at 100° F. This material can be prepared by a mass polymerization process conducted in such a manner that a liquid polymer is produced, for example, by sodium catalyzed polymerization of isoprene or copolymerization of butadiene and styrene or by emulsion polymerization processes which are well known in the art.

It is to be understood that the term "hydrogen peroxide," as used in the specification and claims, includes material capable of yielding hydrogen peroxide as well as hydrogen peroxide per se. The hydrogen peroxide is preferably utilized in aqueous solution of a concentration in the range of 3 to 90 weight percent and preferably in the range of 5 to 40 weight percent. The number of mols of hydrogen peroxide per theoretical aliphatic double bond present in the polymeric starting material is preferably between 0.1 and 10. When less than 1 mol hydrogen peroxide per double bond is used only a part of the double bonds can be hydroxylated. As the amount of hydrogen peroxide is increased, the hydroxylation will approach theoretical.

The hydroxylation reaction of our invention can be practiced with or without a solvent. Oxygen utilization is generally more efficient and better control of the product is possible when a solvent is used; however, with low concentration of hydrogen peroxide, our reaction can be accomplished without a solvent.

Various inert solvents which serve to bring the reactants into intimate contact and permit the reaction to proceed can be used. Examples of solvents suitable for the practice of our invention include normally liquid chlorinated hydrocarbons having a boiling point of not more than 200° C., for example, chloroform, chlorobenzene, carbon tetrachloride, methylene chloride, ethylene chloride, and the like. Vigorous agitation of the reaction mixture is desirable, particularly when no solvent is used.

Catalysts suitable for the hydroxylation reaction of our invention preferably include formic acid and lower alkyl esters thereof, for example, methyl formate, ethyl formate, and propyl formate; however, other hydroxylating catalysts can be used without departing from the spirit and scope of our invention. The catalysts are preferably utilized in equimolar proportions with the hydrogen peroxide; however, mol ratios of catalyst to hydrogen peroxide in the range of 0.75 to 1 to 1.25 to 1 and even in the range of 0.2 to 1 to 2 to 1 can be used in effecting our hydroxylation reaction.

The hydroxylation reaction of our invention is usually carried out at a temperature in the range of 10 to 95° C. and preferably in the range of 25 to 60° C. The time of reaction depends on such factors as temperature of reaction and degree of hydroxylation desired, however, the usual reaction time is in the range of 1 to 60 hours and preferably in the range of 6 to 30 hours.

Pressures within a wide range can be used in the practice of our invention and satisfactory results have been obtained at atmospheric pressure. However, when low-boiling catalysts such as methyl formate are used, or when a low-boiling solvent is used, it is desirable to carry out the hydroxylation reaction at a pressure sufficient to maintain the reaction system in a liquid phase at the reaction temperature. Equipment for carrying out the hydroxylation process of our invention is known to those skilled in the art. For example, when the reaction is conducted in the presence of a formic acid catalyst, a glass reactor fitted with a reflux condenser can be used. However, if the reaction is carried out under superatmospheric pressure, as when a methyl formate catalyst is utilized, a pressure reactor, for example, a stainless or glass lined steel autoclave, is preferred.

The nature of the hydroxylated products of our invention depends largely upon the extent to which the hydroxylation reaction is carried. The degree or extent of hydroxylation in turn depends on various factors including concentration of the hydrogen peroxide solution, the number of mols of hydrogen peroxide employed per theoretical aliphatic double bond present in the polymeric starting material, and presence or lack of solvent in the reaction mixture. Other factors, for example, time and temperature of reaction, may also affect the reaction and the nature of product produced. In general, greater extent of hydroxylation results in less solubility of the hydroxylated polymer or copolymer in paraffin hydrocarbon solvents. Thus, reaction can be carried out such that a white amorphous solid hydroxylated product is produced which is insoluble in acetone and paraffinic hydrocarbons. Such a product is highly hydroxylated and probably partially cross-linked. The hydroxylation reaction can also be carried out such that a viscous liquid hydroxylated product is produced which is soluble in acetone and paraffinic hydrocarbons indicating that the hydroxylation has proceeded to a relatively slight extent. Reaction conditions can also be controlled so as to produce a solid product of a high degree of hydroxylation which may be partly or completely acetone soluble. The degree or extent of hydroxylation is in a general way directly proportional to the concentration of the hydrogen peroxide solution utilized in the reaction and inversely proportional to the ratio of the number of theoretical aliphatic double bonds present in the polymeric starting material to mols of hydrogen peroxide charge utilized in the reaction. For concentrations of hydrogen peroxide above about 15 weight percent, use of a suitable solvent decreases the formation of solid hydroxylated product which is insoluble in organic solvents. Temperature of reaction primarily affects the time of reaction rather than nature of product produced.

Thus, by controlling the initial reactant concentrations and ratios, and by using or not using a solvent, a product varying from a solid which is insoluble in organic solvents to a liquid which is soluble in organic solvents can be produced.

The hydroxylated products of our invention are insoluble in water, and therefore the product, when the reaction is complete, can be separated from any remaining formic acid, hydrogen peroxide, or water-soluble solvent by washing with water. Separation of product can also be accomplished by heating the reacted mixture preferably under reduced pressure so as to drive off water, formic acid, hydrogen peroxide, and solvent, either water-soluble or water-insoluble.

In another embodiment of our invention, esters of hydroxylated polymers and copolymers are prepared by esterifying hydroxylated polymeric material, prepared according to the first mentioned embodiment of our invention, by reaction with monobasic organic acids or anhydrides thereof, or with phosphorus-containing esterifying agents; in the latter case a final esterification with a lower aliphatic alcohol is preferred, forming a neutral mixed ester. The hydroxylated starting material referred to here includes that which has been partially esterified in the hydroxylation reaction. Further, the hydroxylated starting material is preferably substantially completely soluble in acetone, has a hydroxyl number in the range of 40 to 400, and has a saponification number in the range of 0 to 150.

Organic acids suitable for preparation of the esters of our invention can be either saturated or unsaturated monobasic aliphatic acids preferably containing not more than 20 carbon atoms, for example, formic, acetic, caproic, caprylic, lauric, myristic, palmitic, stearic, acrylic, decylenic, dodecylenic, and oleic acids or anhydrides thereof; or aromatic acids preferably containing not more than 12 carbon atoms, for example, benzoic and naphthoic acids and alkyl derivatives thereof, for example, 2-methylbenzoic, 3-methylbenzoic, 2-methyl-3-ethylbenzoic, 2-ethyl-4-isobutylbenzoic, 2-methyl-1-naphthoic, 6-methyl-1-naphthoic, and 4-methyl-1-naphthoic acids and the like or anhydrides thereof. When using unsaturated acids in the practice of our invention, a polymerization inhibitor, for example, tertiary butylcatechol, is desirable to retard polymerization of the unsaturated acid itself. When anhydrides are utilized to produce the esters of our invention, we prefer to use a catalyst, particularly when a high degree of esterification is desired. Examples of such esterifying catalysts include pyridine and sodium acetate.

Esterification by reaction of monobasic organic acids with liquid hydroxylated polymeric material according to our invention can be carried out with or without an inert medium or solvent; however, we prefer to use an inert medium or solvent for the reaction since undesirable side reactions are reduced thereby. It is desirable that the inert medium be selected so that all reactants are soluble therein since optimum results are obtained when only one phase is present. We prefer a normally liquid solvent having a boiling point of not more than 200° C. Solvent suitable for the esterification of hydroxylated polymeric material by reaction with monobasic acids according to our invention include chlorinated hydrocarbons, for example, chloroform, carbon tetrachloride, methylene chloride, ethylene dichloride, chlorobenzene, ethers, for example, dioxane, diethyl ether, diisopropyl ether, dimethyl ether of ethylene glycol, dimethyl ether of diethylene glycol, and aromatic hydrocarbons, for example, benzene, toluene, and xylene. It is also within the scope of our invention to use sufficient esterifying agent, either acid or anhydride, to act as a solvent in the reaction. The solvents can be used alone or in combination when preparing the esters of our invention. The pressure of the esterification reaction of our invention can be chosen within a fairly wide range, and it is preferred to operate at atmospheric pressure; however, when a low boiling solvent is used, it is desirable to carry the reaction out at superatmospheric pressure such that the boiling point of the solvent at that pressure is above the optimum esterification temperature for the reaction mixture.

Temperature of esterification of hydroxylated polymeric material by reaction with a monobasic organic acid is usually chosen in the range of 50 to 200° C. It is preferable to choose a solvent which boils at or above the temperature of reaction; however, as has been noted above, the reaction can be carried out under pressure so that the boiling point of the solvent becomes higher than the temperature of reaction. Time of reaction depends on various factors including temperatures of reaction, activity of esterifying acid, degree of esterification desired, solvent used, and in cases where the esterifying agent is an anhydride, the catalyst employed. In general, the reaction is allowed to proceed for a time sufficient to consume all the esterifying agent or until water is no longer evolved under the reaction conditions.

The degree of esterification of hydroxylated polymeric material by reaction with a monobasic organic acid according to our invention, at any given set of reaction conditions, can be controlled by controlling the ratio of hydroxylated polymeric material to acid, i. e., if less than 100 percent esterification is desired the ratio is chosen so that all acid is consumed when the reaction is complete; however, if substantially complete esterification is desired, the ratio is chosen so that water is no longer evolved when the reaction is complete (there being some acid remaining in the reaction mixture when the reaction is complete).

Further, the esterification reaction of our invention can be effected in the presence of a single acid or anhydride, or a mixture of acids. Also partial esterification can be effected by one acid and a different acid can be employed to complete the reaction. Generally we prefer to esterify to a lesser extent with high molecular weight acids than with low molecular weight acids; however the properties desired in the product ester determine the extent of esterification and type of esterification agent used.

In a specific embodiment for the preparation of a formic ester of hydroxylated polymers and copolymers, liquid polymeric material having a molecular weight of not more than 5000 and a viscosity in the range of 100 to 6000 Saybolt Furol seconds at 100° F. is hydroxylated and esterified by reacting same with aqueous hydrogen peroxide of a concentration in the range of 5 to 40 weight percent in the presence of an excess of formic acid. The amount of formic acid used in any particular instance depends, among other things, upon the degree of esterification desired, i. e., sufficient acid should be added to catalyze the hydroxylation reaction as well as to esterify the hydroxylated polymeric material formed during the reaction. The reaction is preferably effected in the presence of an inert solvent, for example, chloroform. The number of mols of hydrogen peroxide per theoretical aliphatic double bond present in the polymeric starting material is between 0.1 and 10. The first stage of the reaction is effected at a temperature in the range of 10° C. to 95° C. for a time in the range of 1 to 60 hours. It is believed that during this first stage, the formic acid acts primarily as a catalyst in the reaction between the liquid polymeric material and the hydrogen peroxide to form hydroxylated polymeric material, and also simultaneously esterifies a portion of the hydroxylated polymeric material being formed. In the second stage of the reaction, i. e., when the desired degree of hydroxylation has been obtained, the temperature of reaction is increased to a value in the range of 95° C. to 200° C. and the formic acid acts primarily as an esterifying agent. Water is driven off during this second stage and further esterification is effected. Thus, according to the specific embodiment of our invention just described, polymeric material is hydroxylated and esterified in the presence of an agent that reacts first primarily as a catalyst and esterifying agent and later primarily as an esterifying agent. This embodiment is particularly advantageous since it provides an integrated process for the production of an ester of a polymer or copolymer from a single group of reactants in a single reactor.

The esters of our invention produced by reaction of hydroxylated polymers and copolymers and monobasic organic acids or their anhydrides range from viscous liquids to hard, brittle solids with high softening points, the viscosity depending to a large extent upon the degree of hydroxylation of the liquid polymers and copolymers and to a lesser extent upon the degree of esterification. The color of the esters varies from light yellow to reddish brown.

In another embodiment of our invention, hydroxylated polymeric material, prepared according to the above mentioned hydroxylation process, is esterified with a phosphorus-containing esterifying agent. Phosphorus-containing esterifying agents which can be used include phosphorus oxychloride, phosphorus pentoxide, phosphorus trichloride, phosphorus pentachloride, and orthophosphoric acid. When the esters of our invention are to be used as plasticizers or tackifiers for natural or synthetic rubber, a neutral ester is desirable. In such a case, the acid phosphorus-containing ester prepared by esterifying hydroxylated polymers and copolymers by reaction with say phosphorus oxychloride is further reacted with a low molecular weight aliphatic monohydric alcohol containing not more than 8 carbon atoms to produce a neutral mixed phosphorus-containing ester of hydroxylated polymeric material.

The neutral mixed phosphorus-containing esters of our invention contain one or both of two types of characteristic ester units distributed at intervals in the polymer or copolymer chain. These ester units can be represented by

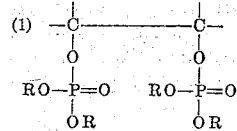

and

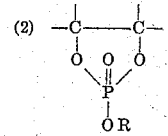

where R is an alkyl group containing not more than 8 carbon atoms. We believe that both types of ester units are present in the esters of our invention with one type or the other predominating, depending upon various operating factors and type of esterifying agent used. Operating factors which determine the extent of esterification include ratio of phosphorus-containing esterifying agent to hydroxyl groups, temperature of reaction, time of reaction and presence or lack of an inert diluent or solvent medium.

Esterification of liquid hydroxylated polymers and copolymers by reaction with a phosphorus-containing esterifying agent can be effected with or without an inert diluent or solvent medium. We prefer use of a normally liquid inert medium in which all reactants are soluble, for example, chlorinated liquid hydrocarbons including chloroform, carbon tetrachloride, methylene chloride, ethylene chloride, chlorobenzene, ethers, including dioxane, diethyl ether, diisopropyl ether, dimethyl ether of ethylene glycol, dimethyl ether of diethylene glycol, and aromatic hydrocarbons, including benzene, toluene and xylene, since optimum results are obtained when only one phase is present. The solvent preferably has a boiling point of not more than 200° C. so that the solvent can be readily removed from the mixture upon completion of the reaction. Sufficient solvent is used to dissolve all reactants, and satisfactory results have been obtained when a solution containing only one percent by weight of hydroxylated polymeric material was used.

The hydroxylated polymeric starting material for the production of the phosphorus-containing esters of our invention is prepared according to the procedure noted above and such starting material is preferably substantially completely soluble in acetone, has a hydroxyl number in the range of 40 to 400, and has a saponification number in the range of 0 to 150. It is believed that only a fraction of the double bonds react and two hydroxyl groups are introduced per reacted double bond when liquid polymeric material is hydroxylated according to our invention.

Hydroxylated polymeric material per se can be used in the preparation of esters of hydroxylated polymers and copolymers or the hydroxylated polymeric material can be partially hydrogenated before esterification and thereby reduce any tendency toward cross-linking or polymerization during the esterification reaction. It is within the scope of our invention to partially hydrogenate the liquid polymeric starting material before hydroxylation, as well as to hydrogenate after hydroxylation, when it is desired to esterify hydrogenated hydroxylated polymeric material. Unhydrogenated hydroxylated polymeric material can be esterified with the phosphorus-containing esterification agents in the presence of a basic material, for example, pyridine or its homologues or dimethylaniline, which will react with acid formed during the esterification reaction and thereby reduce cross-linking or polymerization during the esterification reaction.

As was previously noted, hydrogenated polymeric material can be prepared by hydrogenation of hydroxylated polymeric material or by partial hydrogenation of liquid polymeric material followed by hydroxylation according to the process of our invention, the former method being preferred. The hydrogenation reaction can be carried out with or without an inert solvent medium. We prefer to utilize a solvent in which both the material being hydrogenated (polymeric material or hydroxylated polymeric material as the case may be) and the hydrogenated product are soluble. Solvents which can be used include dioxane, dimethyl ether of ethylene glycol, and dimethyl ether of diethylene glycol. The solvent preferably has a boiling point not greater than 200° C. to facilitate its removal when the hydrogenation reaction is complete. Hydrogenation catalysts applicable for the hydrogenation reaction include nickel on kieselguhr, Raney nickel, platinum, cobalt, and palladium on charcoal. The hydrogenation reaction is preferably carried out at a temperature in the range of 20 to 200° C. and a pressure in the range of 20 to 2000 p. s. i. g. In the case of hydrogenation of hydroxylated polymeric material, the reaction can be continued, if desired, until as much as 90 percent of the double bonds originally present in the liquid polymeric material have been reacted to add either hydroxyl groups or hydrogen thereby producing hydrogenated hydroxylated polymeric material with a degree of unsaturation in the range of 0 to 10 percent. Such a high degree of saturation greatly reduces the tendency toward cross-linking or polymerization during the subsequent esterification reaction.

We prefer to effect our esterification reaction by the phosphorus-containing esterifying agents and any further reaction with an alcohol to produce a neutral mixed ester under an inert atmosphere. Such atmosphere can be provided by use of a suitable inert gas, for example, nitrogen, or by choosing a solvent in each case which boils at the reaction temperature.

The course of esterification can be followed by sampling the reaction mixture during the reaction and analyzing to determine the degree to which the acid groups have been esterified. In this way, the reaction can be stopped when esterification has proceeded to such an extent that a product of desired properties is produced.

In a specific embodiment of our invention, a neutral mixed phosphorus-containing ester is preferably produced by reaction of hydrogenated liquid hydroxylated polymeric material with phosphorus oxychloride and further reaction of the acid ester so produced with a low molecular weight aliphatic monohydric alcohol, for example, butanol, to yield a product which is a neutral mixed phosphorus-containing ester of hydroxylated polymeric material. The amount of phosphorus oxychloride, expressed in terms of the ratio of acid equivalents contained in the phosphorus oxychloride to hydroxyl equivalents contained in the hydroxylated polymeric material, is chosen in the range of 0.33 to 1 to 3 to 1. The acid phosphorus-containing ester is preferably neutralized by reaction with a low molecular weight monohydric aliphatic alcohol, for example, butanol, at a temperature in the range of minus 20 to 100° C. for a time in the range of 1 to 24 hours so as to produce a neutral mixed phosphorus-containing ester of hydroxylated polymeric material which is useful as a plasticizer or tackifier in natural and synthetic rubber.

The neutral mixed phosphorus-containing esters produced according to our invention vary in nature from viscous liquid to stiff, plastic materials and in color from yellow to black.

The esters of our invention have been described as preferably being produced from liquid hydroxylated polymeric material; however, we do not intend to be limited to liquid hydroxylated polymeric material but intend to include esters produced from the solid hydroxylated polymeric material of our invention.

It is understood that conditions of temperature and time of reaction, ratio of reactants, ratio of acid equivalents to hydroxyl equivalents, degree of dilution, presence or lack of solvents, and the like, will depend upon factors including degree and type of ester desired, esterifying agent used, and nature of the starting liquid polymeric material; therefore, we do not intend to be limited by the specific conditions and examples herein set forth as we intend to illustrate and not limit our invention thereby.

Our invention can be more fully understood by applying the following illustrative examples to the discussion and disclosure herein set forth.

EXAMPLE I

Liquid polyisoprene was prepared by charging a one-gallon stirred autoclave with two liters of normal heptane and a catalyst prepared by dispersing five grams of sodium metal in 100 ml. Soltrol–130 (trademark of Phillips Petroleum Company) (isoparaffinic hydrocarbon boiling between 335 and 410° F.) by heating to between 255 and 350° F. and stirring at 10,000 R. P. M.'s. The autoclave was heated to 200° F., and one pound of freshly distilled isoprene was added over a period of one hour and 25 minutes at a reaction temperature of 205° to 210°

F. The mixture was then cooled to 100° F. and the catalyst destroyed with methanol. The solution was washed with water and stripped in a falling film column at a temperature of 345° F. and under a pressure of 10 to 20 mm. of mercury. The polyisoprene was a viscous liquid having a viscosity of 3960 Saybolt Furol Seconds at 100° F.

A three-liter round bottom flask fitted with stirrer, reflux condenser and addition funnel was charged with 216 grams of polyisoprene, 1725 grams of chloroform, 53.5 grams of formic acid (86%), and 117 grams of hydrogen peroxide (29%). The reaction mixture was stirred overnight at a temperature of 122° F. after which the reactor contents were removed, washed three times with 500 ml. of water, and stripped in a flask heated to a temperature of 212° F. under pressure of 5 to 10 mm. of mercury. A nitrogen bleed was used in the polymer to flush out light materials. Analysis of the resulting product, which was a very viscous liquid, gave the results set forth hereinafter in Table I.

A sample of this product was dissolved in toluene, applied to tin plate and baked for 12 minutes at 400° F. Pencil hardness of the film was 5, and it could be bent over a 0.25 inch mandrel without cracking.

EXAMPLE II

An 85/15 butadiene-styrene sodium catalyzed liquid copolymer was hydroxylated by charging a round bottom flask, fitted as described in Example I, with 216 grams of the copolymer, 1728 grams of chloroform, 53.5 grams of formic acid (86%), and 117 grams of hydrogen peroxide (29%). This reaction mixture was heated with stirring in a water bath maintained at a temperature of 122° F. for 24 hours. The reaction product was removed from the flask, washed three times with 500 ml. water, and stripped in a falling film column heated at a temperature of 208° F. at a pressure of 2 to 10 mm. of mercury. Analysis of the resulting product, which was a viscous liquid, gave the results set forth hereinafter in Table I.

The hydroxylated copolymer of butadiene-styrene was dissolved in toluene, brushed on tin plate and baked for 15 minutes at 400° F. The resulting film had a pencil hardness of 6, good "Scotch tape" adhesion and could be bent over a 0.25 inch madrel without cracking.

Driers were added to portions of the toluene solution as described above to make 0.04 percent colbalt, 0.04 percent manganese, and 0.2 percent lead, and films were applied to glass with a 3-mil applicator. The films were hard dry after 48 hours.

EXAMPLE III

A 75/25 butadiene-isoprene sodium catalyzed liquid copolymer was hydroxylated by charging a round bottom flask, fitted as described in Example I, with 216 grams of the copolymer, 1728 grams of chloroform, 53.5 grams of formic acid (86%), and 117 grams of hydrogen peroxide (29%). The flask was heated in a water bath at a temperature of 122° F. for 24 hours after which the reaction product was removed from the flask, washed three times with 500 ml. water, and stripped in a falling film column at a temperature of 208° F. at a pressure of 2 to 10 mm. of mercury. Analysis of the resulting product, which was a viscous liquid, gave the results set forth hereinafter in Table I.

A portion of the hydroxylated copolymer of butadiene-isoprene was dissolved in toluene, brushed on tin plate and baked for 15 miuites at 400° F. The baked film had a pencil hardness of 6, good "Scotch tape" adhesion, and could be bent on a 0.25 inch madrel without cracking.

Driers were added to portions of the toluene solution as described above to provide 0.04 percent cobalt, 0.04 percent manganese, and 0.02 percent lead, and films were applied to glass with a 3-mil applicator. These films were hard dry after 48 hours.

*Table I*

| | Example I (Isoprene) | Example II (Butadiene-Styrene) | Example III (Butadiene-isoprene) |
|---|---|---|---|
| Product Analysis weight percent: | | | |
| C | 81.53 | 77.67 | 73.84 |
| H | 11.15 | 9.34 | 9.65 |
| Cl | 2.40 | 3.30 | 6.07 |
| O (by difference) | 4.92 | 9.69 | 10.44 |
| Hydroxyl No.[1] | 66 | 157 | 130 |
| Saponification No.[2] | 15.8 | 101 | 144 |
| Acid No.[3] | <1 | <1 | <1 |
| Calculated Product, Analysis, wgt. percent: | | | |
| Hydroxy | 2.0 | 4.8 | 3.9 |
| Formoxy | 1.27 | 8.1 | 11.5 |
| OH in formoxy | 0.48 | 3.1 | 4.3 |
| Total hydroxy | 2.48 | 7.9 | 8.2 |
| O in hydroxy and formoxy | 2.24 | 10.3 | 11.9 |

[1] Sample was esterified with acetic anhydride in a pyridine solution. Water was added and acetic acit titrated with potassium hydroxide. Correction was made for any free acid in original sample. A control was run in the same manner omitting the sample, and the difference in milligrams KOH per gram sample was reported as the hydroxyl number.
[2] Sample was refluxed with excess potassium hydroxide in a solvent for 2 hours. Excess KOH was titrated with HCl. Milligrams KOH reacted with one gram sample was reported as saponification number.
[3] Milligrams potassium hydroxide required to neutralize acids present in one gram of sample was reported as acid number.

EXAMPLE IV

An acetate ester of hydroxylated butadiene-isoprene copolymer was prepared by mixing in a round bottomed flask, fitted as described in Example I, 66 grams of hydroxylated butadiene-isoprene copolymer with 60 grams of acetic anhydride and 60 grams of pyridine. This mixture was refluxed for three hours. 500 ml. of normal heptane was added, and the normal heptane, pyridine and excess acetic anhydride were removed by distillation. The flask was surrounded by an oil bath heated to 300° F. After the major portion of the solvent had been removed, the distillation pressure was reduced to 5–20 mm. Hg absolute to remove the impurities as completely as possible. The resulting product was a black rubbery solid. Analysis of the product indicated that it had a saponification number of 234 as compared with the saponification number of 144 of the hydroxylated copolymer starting material. This indicates that a considerable proportion of the free hydroxyl groups of the hydroxylated copolymer were esterified by the acetic anhydride.

The foregoing examples are for purposes of illustration of our invention and we do not desire to be unduly limited thereby. As will be evident to those skilled in the art, various modifications of this invention can be made or followed without departing from the spirit or scope of the disclosure.

We claim:

1. A process for the production of hydroxylated polymeric material which comprises reacting a liquid copolymer of a conjugated diene containing from 4 to 8 carbon atoms and a compound copolymerizable therewith containing an active $CH_2=C<$ group with aqueous hydrogen peroxide in the presence of a catalyst selected from the group consisting of formic acid, methyl formate, ethyl formate and propyl formate, at a temperature in the range of 10° C. to 95° C. for a time in the range of 1 to 60 hours, the number of mols of hydrogen peroxide per theoretical aliphatic double bond present in said liquid copolymer being in the range of 0.1 to 10, the mol ratio of said catalyst to said hydrogen peroxide being in the range of 0.2 to 1 to 2 to 1, and the concentration of said aqueous hydrogen peroxide being in the range of 3 to 90 weight percent.

2. The process of claim 1 in which said liquid copolymer is a copolymer of butadiene and styrene.

3. The process of claim 1 in which said liquid copolymer is a copolymer of butadiene and isoprene.

4. The process of claim 1 in which said liquid copolymer is a copolymer of butadiene and 2-methyl-5-vinyl-pyridine.

5. A composition of matter which comprises hydroxylated polymeric material produced by reacting a liquid copolymer of a conjugated diene containing from 4 to 8 carbon atoms and a compound copolymerizable therewith containing an active $CH_2=C<$ group with aqueous hydrogen peroxide in the presence of a catalyst selected from the group consisting of formic acid, methyl formate, ethyl formate, and propyl formate, at a temperature in the range of 10° to 95° C. for a time in the range of 1 to 60 hours, said hydroxylated liquid polymeric material ranging from a viscous liquid to a glassy solid.

6. A composition of matter which comprises hydroxylated polymeric material produced by reacting a copolymer of butadiene and styrene with aqueous hydrogen peroxide in the presence of a catalyst selected from the group consisting of formic acid, methyl formate, ethyl formate, and propyl formate, and at a temperature in the range of 10° to 95° C. for a time in the range of 1 to 60 hours, said hydroxylated liquid polymeric material ranging from a viscous liquid to a glassy solid.

7. A composition of matter which comprises hydroxylated polymeric material produced by reacting a copolymer of butadiene and isoprene with aqueous hydrogen peroxide in the presence of a catalyst selected from the group consisting of formic acid, methyl formate, ethyl formate, and propyl formate, and at a temperature in the range of 10° to 95° C. for a time in the range of 1 to 60 hours, said hydroxylated liquid polymeric material ranging from a viscous liquid to a glassy solid.

8. A composition of matter which comprises hydroxylated polymeric material produced by reacting a copolymer of butadiene and 2-methyl-5-vinyl-pyridine with aqueous hydrogen peroxide in the presence of a catalyst selected from the group consisting of formic acid, methyl formate, ethyl formate, and propyl formate, and at a temperature in the range of 10° to 95° C. for a time in the range of 1 to 60 hours, said hydroxylated liquid polymeric material ranging from a viscous liquid to a glassy solid.

References Cited in the file of this patent
UNITED STATES PATENTS

| | | |
|---|---|---|
| 2,500,599 | Bergsteinsson et al. | Mar. 14, 1950 |
| 2,555,927 | Himel et al. | June 5, 1951 |
| 2,692,892 | Hillyer et al. | Oct. 26, 1954 |
| 2,693,461 | Jones | Nov. 2, 1954 |

UNITED STATES PATENT OFFICE
CERTIFICATE OF CORRECTION

Patent No. 2,838,478　　　　　　　　　　　　　　　　　　June 10, 1958

John C. Hillyer et al.

It is hereby certified that error appears in the printed specification of the above numbered patent requiring correction and that the said Letters Patent should read as corrected below.

Column 6, line 19, for "presense" read -- presence of a single inert solvent and in the presence --.

Signed and sealed this 18th day of November 1958.

(SEAL)
Attest:

KARL H. AXLINE
Attesting Officer

ROBERT C. WATSON
Commissioner of Patents